US009155939B2

(12) United States Patent
Shiga et al.

(10) Patent No.: US 9,155,939 B2
(45) Date of Patent: *Oct. 13, 2015

(54) GOLF BALL RESIN COMPOSITION AND GOLF BALL

(75) Inventors: Kazuki Shiga, Kobe (JP); Ryo Murakami, Kobe (JP); Takahiro Shigemitsu, Kobe (JP); Hideaki Kimura, Kobe (JP); Tomoka Kitago, Hyogo (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 216 days.

This patent is subject to a terminal disclaimer.

(21) Appl. No.: 13/614,807

(22) Filed: Sep. 13, 2012

(65) Prior Publication Data

US 2013/0079178 A1    Mar. 28, 2013

(30) Foreign Application Priority Data

Sep. 22, 2011  (JP) ................... 2011-207716
Sep. 7, 2012   (JP) ................... 2012-197230

(51) Int. Cl.
*A63B 37/00* (2006.01)
*C08K 5/19* (2006.01)
*C08L 23/08* (2006.01)

(52) U.S. Cl.
CPC ......... *A63B 37/0064* (2013.01); *A63B 37/0003* (2013.01); *A63B 37/0039* (2013.01); *A63B 37/0043* (2013.01); *A63B 37/0048* (2013.01); *A63B 37/0051* (2013.01); *A63B 37/0062* (2013.01); *A63B 37/0063* (2013.01); *A63B 37/0073* (2013.01); *A63B 37/0074* (2013.01); *A63B 37/0078* (2013.01); *A63B 37/0094* (2013.01); *A63B 2037/0079* (2013.01); *C08K 5/19* (2013.01); *C08L 23/0869* (2013.01); *C08L 23/0876* (2013.01)

(58) Field of Classification Search
None
See application file for complete search history.

(56) References Cited

U.S. PATENT DOCUMENTS

| 2006/0014898 A1 | 1/2006 | Kim |
| 2009/0203469 A1* | 8/2009 | Sullivan ................. 473/374 |
| 2010/0048327 A1* | 2/2010 | Bulpett et al. ........... 473/374 |
| 2013/0172112 A1* | 7/2013 | Kanemitsu et al. ...... 473/372 |
| 2014/0031145 A1* | 1/2014 | Kitamura et al. ........ 473/372 |

FOREIGN PATENT DOCUMENTS

| JP | 2006-028517 | 2/2006 |
| JP | 2009197088 | * 9/2009 |

* cited by examiner

*Primary Examiner* — David Buttner
(74) *Attorney, Agent, or Firm* — Birch, Stewart, Kolasch & Birch, LLP

(57) ABSTRACT

The present invention aims to provide a golf ball resin composition excellent in resilience and flexibility, and a golf ball having excellent properties in terms of resilience and shot feeling. The present invention relates to a golf ball resin composition, including: (A) at least one selected from the group consisting of: (a-1) a binary copolymer of an olefin and a C3-C8 α,β-unsaturated carboxylic acid; (a-2) a metal ion-neutralized product of a binary copolymer of an olefin and a C3-C8 α,β-unsaturated carboxylic acid; (a-3) a ternary copolymer of an olefin, a C3-C8 α,β-unsaturated carboxylic acid, and an α,β-unsaturated carboxylic acid ester; and (a-4) a metal ion-neutralized product of a ternary copolymer of an olefin, a C3-C8 α,β-unsaturated carboxylic acid, and an α,β-unsaturated carboxylic acid ester, and (B) a compound containing a hydrocarbon chain, a cationic moiety, and an anionic moiety in its molecule.

13 Claims, 3 Drawing Sheets

GOLF BALL RESIN COMPOSITION AND GOLF BALL

TECHNICAL FIELD

The present invention relates to a golf ball resin composition and a golf ball produced using the same.

BACKGROUND ART

Golf balls of various structures have been proposed such as one-piece golf balls which consist of a golf ball body; two-piece golf balls which include a core and a cover; three-piece golf balls which include a core having a center and a single intermediate layer covering the center, and a cover covering the core; and multi-piece golf balls which include a core having a center and two or more intermediate layers covering the center, and a cover covering the core.

Widely used materials for golf balls are ionomer resins because such resins provide golf balls which have high rigidity and which fly a long distance; in particular, highly resilient materials are desired. Ionomer resins having an increased degree of neutralization are known to enhance resilience. They, however, tend to increase the hardness simultaneously, which results in lower flexibility and a poorer shot feeling.

In this respect, a method of decreasing the hardness while enhancing resilience is proposed. In this method, a large amount of a fatty acid (metallic soap) is added to a highly neutralized ionomer resin; however, the acid component in the fatty acid consumes metal ions used for neutralization, and therefore the effect of enhancing resilience due to a high degree of neutralization is not sufficiently achieved. Thus, the method has an insufficient effect in enhancing flexibility and resilience in order to provide a golf ball that simultaneously achieves a good shot feeling and resilience. In addition, the method requires a large amount of the metal component.

For example, Patent Literature 1 discloses a golf ball material prepared using an ionomer resin and a compound that contains both acid and amine functional groups in the same molecule. This golf ball material, however, should still be improved from the viewpoint of simultaneous enhancement of flexibility and resilience.

CITATION LIST

Patent Literature

Patent Literature 1: JP 2006-28517 A

SUMMARY OF INVENTION

Technical Problem

The present invention aims to provide a golf ball resin composition which can solve the above problems and which is excellent in resilience and flexibility. The present invention also aims to provide a golf ball having excellent properties in terms of resilience and shot feeling.

Solution to Problem

The present invention relates to a golf ball resin composition, including: (A) a resin component containing at least one selected from the group consisting of: (a-1) a binary copolymer of an olefin and a C3-C8 α,β-unsaturated carboxylic acid; (a-2) a metal ion-neutralized product of a binary copolymer of an olefin and a C3-C8 α,β-unsaturated carboxylic acid; (a-3) a ternary copolymer of an olefin, a C3-C8 α,β-unsaturated carboxylic acid, and an α,β-unsaturated carboxylic acid ester; and (a-4) a metal ion-neutralized product of a ternary copolymer of an olefin, a C3-C8 α,β-unsaturated carboxylic acid, and an α,β-unsaturated carboxylic acid ester, and (B) a compound containing a hydrocarbon chain, a cationic moiety, and an anionic moiety in its molecule.

The compound (B) is preferably an amphoteric surfactant.

The amphoteric surfactant is preferably at least one selected from the group consisting of betaine amphoteric surfactants, amide amino acid amphoteric surfactants, alkyl amino fatty acid salts, alkyl amine oxides, β-alanine amphoteric surfactants, glycine amphoteric surfactants, sulfobetaine amphoteric surfactants, and phosphobetaine amphoteric surfactants.

In the golf ball resin composition, the compound (B) is preferably present in an amount of 1 to 200 parts by mass for each 100 parts by mass of the resin component.

The golf ball resin composition preferably further includes (C) a basic inorganic metal compound in an amount of 100 parts by mass or less for each 100 parts by mass of the resin component.

The amphoteric surfactant is preferably an alkyl betaine amphoteric surfactant represented by the following formula (1):

wherein $R^1$ represents a C8-C30 alkyl group or alkenyl group; and $R^2$ and $R^3$ are the same as or different from each other, and they each represent a C1-C20 alkyl group or hydroxyalkyl group.

The basic inorganic metal compound (C) is preferably selected from the group consisting of magnesium hydroxide, calcium hydroxide, sodium carbonate, lithium carbonate, potassium carbonate, zinc oxide, and copper oxide.

The golf ball resin composition preferably has a total degree of neutralization of 53% or higher, the total degree of neutralization being determined by the following formula.

$$\text{Total degree of neutralization (\%)} = \frac{\sum\left(\begin{array}{l}\text{(the number of moles of cationic components} \\ \text{in the resin composition}\end{array}\right) \times \\ \text{(the valence of the cationic components)}}{\sum\left(\begin{array}{l}\text{(the number of moles of anionic components} \\ \text{in the resin composition}\end{array}\right) \times \\ \text{(the valence of the anionic components)}} \times 100$$

The present invention relates to a golf ball, including a member made from the aforementioned golf ball resin composition.

The present invention relates to a golf ball, including: a core having one or more layers; and a cover covering the core, wherein at least one of the layers of the core is made from the aforementioned golf ball resin composition.

The present invention also relates to a one-piece golf ball, including a golf ball body that is made from the aforementioned golf ball resin composition.

Advantageous Effects of Invention

In the present invention, a compound containing a hydrocarbon chain, a cationic moiety, and an anionic moiety in its molecule is added to a specific resin, and therefore a golf ball resin composition excellent in resilience and flexibility is provided. As a result, use of the resin composition enables to provide a golf ball having excellent properties in terms of resilience and shot feeling.

DESCRIPTION OF EMBODIMENTS

Figure 1:
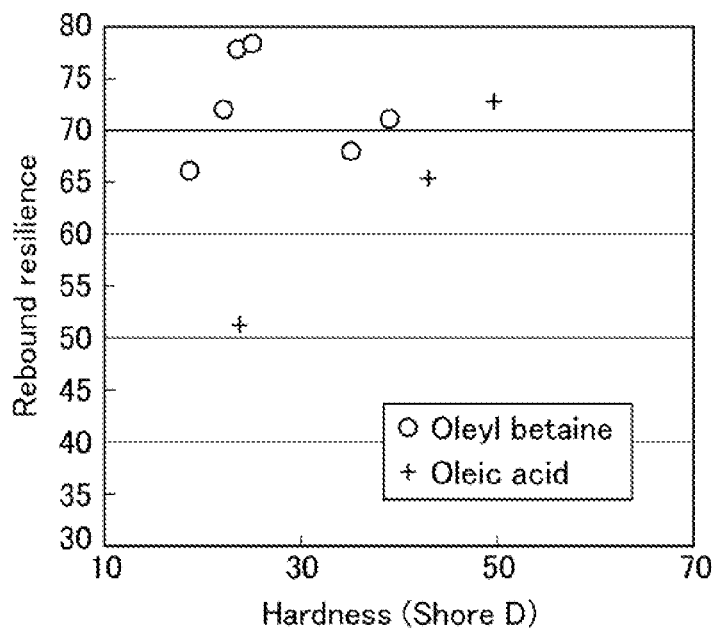
FIG. 1 is a graph showing the relationships between rebound resilience and Shore D hardness in examples and comparative examples of the present invention (ternary copolymer+oleyl betaine, oleic acid).
Figure 2:
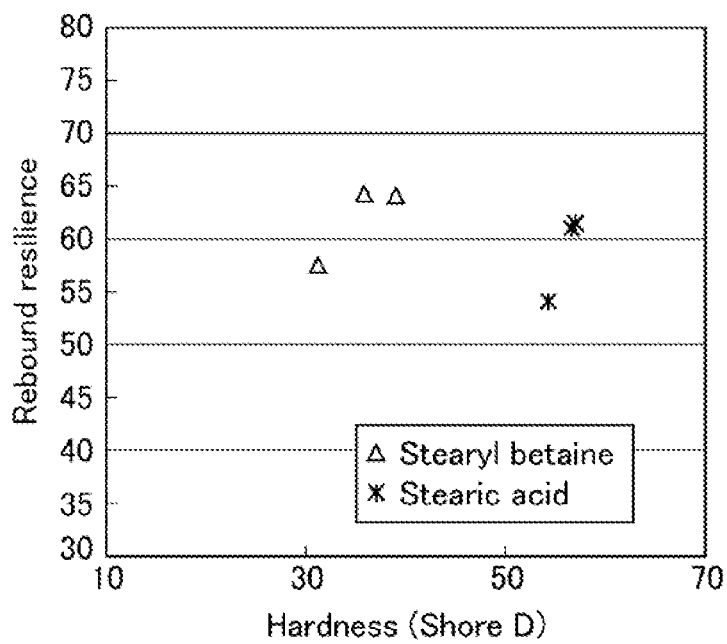
FIG. 2 is a graph showing the relationships between rebound resilience and Shore D hardness in examples and comparative examples of the present invention (ternary copolymer+stearyl betaine, stearic acid).
Figure 3:
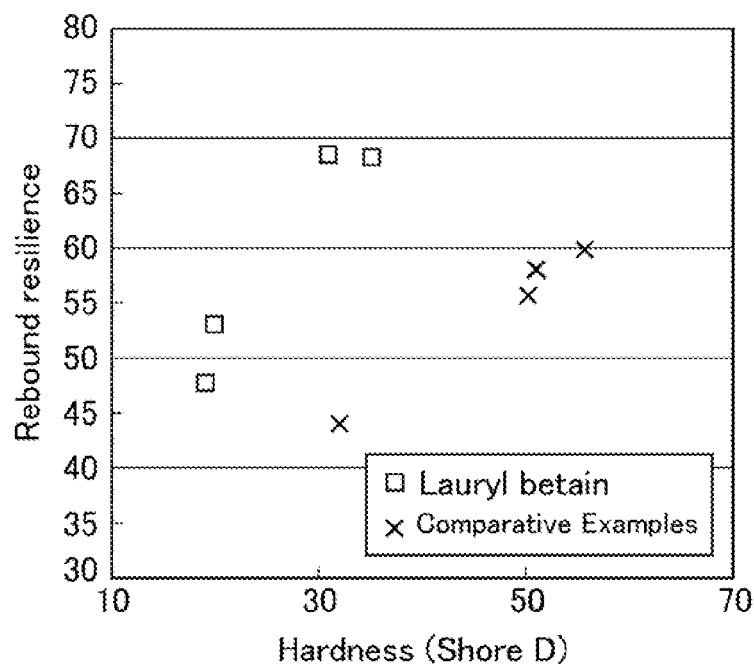
FIG. 3 is a graph showing the relationships between rebound resilience and Shore D hardness in examples and comparative examples of the present invention (ternary copolymer+lauryl betaine).
Figure 4:
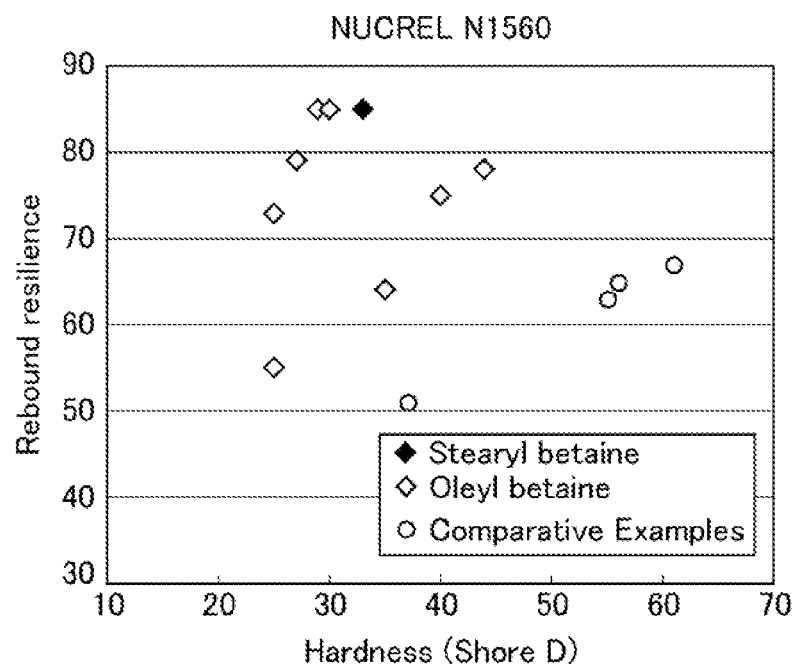
FIG. 4 is a graph showing the relationships between rebound resilience and Shore D hardness in examples and comparative examples of the present invention (binary copolymer (NUCREL N1560)+oleyl betaine or stearyl betaine).
Figure 5:
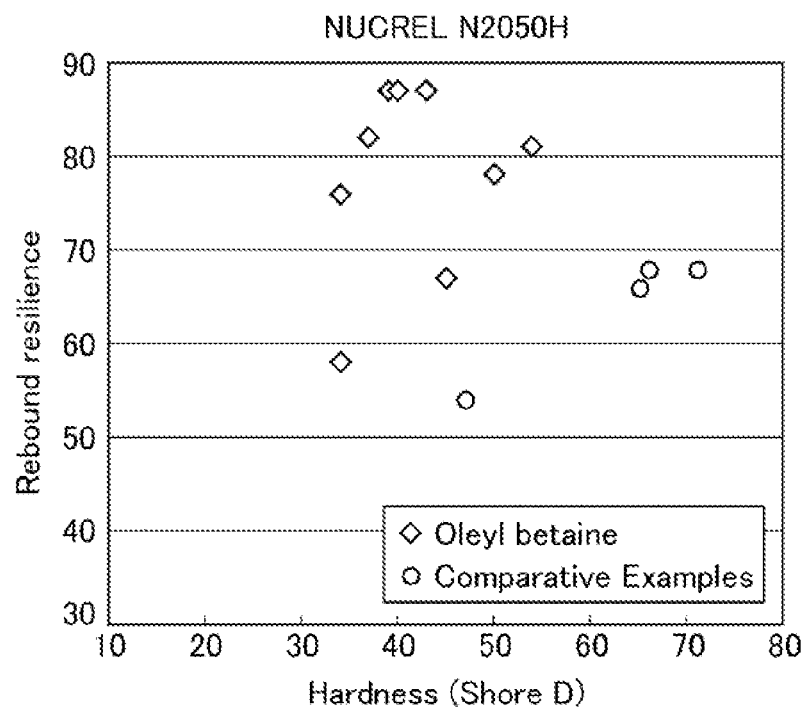
FIG. 5 is a graph showing the relationships between rebound resilience and Shore D hardness in examples and comparative examples of the present invention (binary copolymer (NUCREL N2050H)+oleyl betaine).

The golf ball resin composition of the present invention includes: (A) a resin component containing at least one selected from the group consisting of: (a-1) a binary copolymer of an olefin and a C3-C8 $\alpha,\beta$-unsaturated carboxylic acid; (a-2) a metal ion-neutralized product of a binary copolymer of an olefin and a C3-C8 $\alpha,\beta$-unsaturated carboxylic acid; (a-3) a ternary copolymer of an olefin, a C3-C8 $\alpha,\beta$-unsaturated carboxylic acid, and an $\alpha,\beta$-unsaturated carboxylic acid ester; and (a-4) a metal ion-neutralized product of a ternary copolymer of an olefin, a C3-C8 $\alpha,\beta$-unsaturated carboxylic acid, and an $\alpha,\beta$-unsaturated carboxylic acid ester, and (B) a compound containing a hydrocarbon chain, a cationic moiety, and an anionic moiety in its molecule.

As mentioned above, it is difficult to provide a golf ball material having both good resilience and good flexibility by using a resin component such as an ionomer resin. However, the addition of a compound containing a hydrocarbon chain, a cationic moiety, and an anionic moiety enables to simultaneously enhance flexibility and resilience, and therefore a golf ball having excellent properties in terms of resilience and shot feeling can be provided. The reason why such effects are achieved is presumably as follows.

In the case that a compound containing a hydrocarbon chain, a cationic moiety, and an anionic moiety is added to an ionomer resin, the compound molecules are thought to be involved into ionic associates of the ionomer resin and then serve to: (I) finely disperse the ionic associates and thereby inhibit crystallization of the ethylene chains; and to (II) loosen the restriction of main chains which is due to the ionic associates. Presumably, such effects lead to increased mobility of the molecular chains of the ionomer resin, and therefore both the flexibility and resilience are simultaneously enhanced.

Also in this case, unlike the case of adding a fatty acid, the metal component is not consumed since the above compound has both cationic and anionic moieties. Thus, the effect of enhancing resilience due to a high degree of neutralization can be sufficiently achieved without using a large amount of the metal component. Therefore, the flexibility and resilience are efficiently achieved simultaneously.

First of all, the components (a-1) to (a-4) used as the resin component (A) in the present invention are described below.

The component (a-1) is a binary copolymer of an olefin and a C3-C8 $\alpha,\beta$-unsaturated carboxylic acid, and it is a nonionic one in which the carboxyl groups of the copolymer are not neutralized. The component (a-2) is a metal ion-neutralized product of a binary copolymer of an olefin and a C3-C8 $\alpha,\beta$-unsaturated carboxylic acid, and examples thereof include ionomer resins obtained by neutralizing at least part of the carboxyl groups of the copolymer with a metal ion.

The component (a-3) is a ternary copolymer of an olefin, a C3-C8 $\alpha,\beta$-unsaturated carboxylic acid, and an $\alpha,\beta$-unsaturated carboxylic acid ester, and it is a nonionic one in which the carboxyl groups of the copolymer are not neutralized. The component (a-4) is a metal ion-neutralized product of a ternary copolymer of an olefin, a C3-C8 $\alpha,\beta$-unsaturated carboxylic acid, and an $\alpha,\beta$-unsaturated carboxylic acid ester, and examples thereof include ionomer resins obtained by neutralizing at least part of the carboxyl groups of the copolymer with a metal ion.

In the present invention, the "binary copolymer (a-1) of an olefin and a C3-C8 $\alpha,\beta$-unsaturated carboxylic acid" may also be referred to simply as the "binary copolymer"; the "ionomer resin consisting of (a-2) a metal ion-neutralized product of a binary copolymer of an olefin and a C3-C8 $\alpha,\beta$-unsaturated carboxylic acid" as the "binary ionomer resin"; the "ternary copolymer (a-3) of an olefin, a C3-C8 $\alpha,\beta$-unsaturated carboxylic acid, and an $\alpha,\beta$-unsaturated carboxylic acid ester" simply as the "ternary copolymer"; and the "ionomer resin consisting of (a-4) a metal ion-neutralized product of a ternary copolymer of an olefin, a C3-C8 $\alpha,\beta$-unsaturated carboxylic acid, and an $\alpha,\beta$-unsaturated carboxylic acid ester" as the "ternary ionomer resin".

In the components (a-1) to (a-4), the olefin is preferably a C2-C8 olefin. Examples thereof include ethylene, propylene, butene, pentene, hexene, heptene, and octene, and particularly preferred is ethylene. Examples of the C3-C8 $\alpha,\beta$-unsaturated carboxylic acid include acrylic acid, methacrylic acid, fumaric acid, maleic acid, and crotonic acid, and particularly preferred are acrylic acid and methacrylic acid. Examples of the $\alpha,\beta$-unsaturated carboxylic acid ester include methyl, ethyl, propyl, n-butyl and isobutyl esters of acrylic acid, methacrylic acid, fumaric acid, maleic acid and the like, and particularly preferred are acrylic acid esters and methacrylic acid esters.

The binary copolymer (a-1) is preferably a binary copolymer of ethylene and (meth)acrylic acid, and the binary ionomer resin (a-2) is preferably a metal ion-neutralized product of a binary copolymer of ethylene and (meth)acrylic acid. The ternary copolymer (a-3) is preferably a ternary copolymer of ethylene, (meth)acrylic acid, and a (meth)acrylic acid ester, and the ternary ionomer resin (a-4) is preferably a metal ion-neutralized product of a ternary copolymer of ethylene, (meth)acrylic acid, and a (meth)acrylic acid ester. The term "(meth)acrylic acid" herein means acrylic acid and/or methacrylic acid.

The amount of units of the C3-C8 α,β-unsaturated carboxylic acid in the binary copolymer (a-1) or the ternary copolymer (a-3) is preferably 4% by mass or more, and more preferably 5% by mass or more. The amount is also preferably 30% by mass or less, and more preferably 25% by mass or less.

The binary copolymer (a-1) or the ternary copolymer (a-3) preferably has a melt flow rate (190° C., 2.16 kg load) of 5 g/10 min or higher, more preferably 10 g/10 min or higher, and further preferably 15 g/10 min or higher. The melt flow rate is also preferably 1700 g/10 min or lower, more preferably 1500 g/10 min or lower, and further preferably 1300 g/10 min or lower. When the melt flow rate is 5 g/10 min or higher, the golf ball resin composition has favorable fluidity and therefore is readily molded into a member of a golf ball. When the melt flow rate is 1700 g/10 min or lower, a golf ball having better durability can be obtained.

Specific examples (indicated by trade name) of the binary copolymer (a-1) include ethylene-methacrylic acid copolymers available from DU PONT-MITSUI POLYCHEMICALS CO., LTD. under the trade name "NUCREL (registered trademark) (e.g. "NUCREL N 1050H", "NUCREL N 2050H", "NUCREL N 1110H", "NUCREL N 0200H", "NUCREL N 1560")", and an ethylene-acrylic acid copolymer available from The Dow Chemical Company under the trade name "PRIMACOR (registered trademark) 5980I".

Specific examples (indicated by trade name) of the ternary copolymer (a-3) include "NUCREL (registered trademark) (e.g. "NUCREL AN 4318", "NUCREL AN 4319")" available from DU PONT-MITSUI POLYCHEMICALS CO., LTD., "NUCREL (registered trademark) (e.g. "NUCREL AE")" available from Du Pont, and "PRIMACOR (registered trademark) (e.g. "PRIMACOR AT 310", "PRIMACOR AT 320")" available from The Dow Chemical Company. The binary copolymer (a-1) or ternary copolymer (a-3) may be only one species, or may be a combination of two or more species.

The amount of units of the C3-C8 α,β-unsaturated carboxylic acid in the binary ionomer resin (a-2) is preferably 8% by mass or more, more preferably 10% by mass or more, and further preferably 12% by mass or more. The amount is also preferably 30% by mass or less, and more preferably 25% by mass or less. When the amount is 8% by mass or more, a member having desired resilience can be easily obtained. When the amount is 30% by mass or less, a member having moderate melt viscosity can be obtained, which indicates good moldability.

The degree of neutralization of the carboxyl groups of the binary ionomer resin (a-2) is preferably 15 mol % or higher, and more preferably 20 mol % or higher. The degree of neutralization is also preferably 90 mol % or lower, and more preferably 85 mol % or lower. When the degree is 15 mol % or higher, a golf ball having good resilience and durability can be obtained. Also, when the degree is 90 mol % or lower, the golf ball resin composition has good fluidity.

The degree of neutralization of the carboxyl groups of the binary ionomer resin (a-2) can be determined by the following formula:

Degree of neutralization of binary ionomer resin=100×(the number of moles of neutralized carboxyl groups of binary ionomer resin)/(the total number of moles of carboxyl groups of binary ionomer resin before neutralization).

Examples of metal ions usable for neutralizing at least part of the carboxyl groups of the binary ionomer resin (a-2) include: monovalent metal ions such as sodium, potassium, and lithium; bivalent metal ions such as magnesium, calcium, zinc, barium, and cadmium; trivalent metal ions such as aluminum; and other ions such as tin and zirconium.

Specific examples (indicated by trade name) of the binary ionomer resin (a-2) include "Himilan (registered trademark) (e.g. Himilan 1555 (Na), Himilan 1557 (Zn), Himilan 1605 (Na), Himilan 1706 (Zn), Himilan 1707 (Na), Himilan AM 7311 (Mg), Himilan AM 7329 (Zn))" available from DU PONT-MITSUI POLYCHEMICALS CO., LTD. Examples thereof further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD 8546 (Li))" available from Du Pont. Other examples include ionomer resins available from ExxonMobil Chemical such as "Iotek (registered trademark) (e.g. Iotek 8000 (Na), Iotek 8030 (Na), Iotek 7010 (Zn), Iotek 7030 (Zn))". The symbols such as Na, Zn, Li, and Mg in the parentheses following the trade names indicate metal species of the metal ions for neutralization. The binary ionomer resin (a-2) may be only one of the above examples, or may be a mixture of two or more of them.

The binary ionomer resin (a-2) preferably has a bending rigidity of 140 MPa or higher, more preferably 150 MPa or higher, and further preferably 160 MPa or higher. The bending rigidity is also preferably 550 MPa or lower, more preferably 500 MPa or lower, and further preferably 450 MPa or lower. Too low a bending rigidity tends to lead to a golf ball with reduced resilience and therefore shorter flight distance; too high a bending rigidity may lead to a golf ball with reduced durability.

The binary ionomer resin (a-2) preferably has a melt flow rate (190° C., 2.16 kg load) of 0.1 g/10 min or higher, more preferably 0.5 g/10 min or higher, and further preferably 1.0 g/10 min or higher. The melt flow rate is also preferably 30 g/10 min or lower, more preferably 20 g/10 min or lower, and further preferably 15 g/10 min or lower. When the melt flow rate is 0.1 g/10 min or higher, the golf ball resin composition has good fluidity, and can be molded into, for example, a thin layer. When the melt flow rate is 30 g/10 min or lower, a golf ball having better durability can be obtained.

The binary ionomer resin (a-2) preferably has a slab hardness of 10 or higher, more preferably 15 or higher, and further preferably 20 or higher in Shore D hardness. The slab hardness (Shore D hardness) is also preferably 75 or lower, more preferably 73 or lower, and further preferably 70 or lower. When the slab hardness is 10 or higher, a member having good resilience can be obtained. When the slab hardness is 75 or lower, a member having moderate hardness and therefore a golf ball having better durability can be obtained.

The amount of units of the C3-C8 α,β-unsaturated carboxylic acid in the ternary ionomer resin (a-4) is preferably 2% by mass or more, and more preferably 3% by mass or more. The amount is also preferably 30% by mass or less, and more preferably 25% by mass or less.

The degree of neutralization of the carboxyl groups of the ternary ionomer resin (a-4) is preferably 20 mol % or higher, and more preferably 30 mol % or higher. The degree of neutralization is also preferably 90 mol % or lower, and more preferably 85 mol % or lower. When the degree is 20 mol % or higher, a golf ball having good resilience and durability can be produced using the golf ball resin composition. When the degree is 90 mol % or lower, the golf ball resin composition has good fluidity.

The degree of neutralization of the carboxyl groups of the ternary ionomer resin (a-4) can be determined by the following formula:

Degree of neutralization of ternary ionomer resin=100×(the number of moles of neutralized carboxyl groups of ternary ionomer resin)/(the total number of moles of carboxyl groups of ternary ionomer resin before neutralization).

Examples of metal ions usable for neutralizing at least part of the carboxyl groups of the ternary ionomer resin (a-4) include those listed for the binary ionomer resin (a-2). The ternary ionomer resin (a-4) is preferably one neutralized by magnesium ions. Neutralization by magnesium ions leads to high rebound resilience.

Specific examples (indicated by trade name) of the ternary ionomer resin (a-4) include "Himilan (registered trademark) (e.g. Himilan AM 7327 (Zn), Himilan 1855 (Zn), Himilan 1856 (Na), Himilan AM 7331 (Na))" available from DU PONT-MITSUI POLYCHEMICALS CO., LTD. Other examples include ternary ionomer resins available from Du Pont such as "Surlyn 6320 (Mg), Surlyn 8120 (Na), Surlyn 8320 (Na), Surlyn 9320 (Zn), and Surlyn 9320W (Zn)". Further examples include ternary ionomer resins available from ExxonMobil Chemical such as "Iotek 7510 (Zn) and Iotek 7520 (Zn)". The symbols such as Na, Zn, and Mg in the parentheses following the trade names indicate metal species of the metal ions for neutralization. The ternary ionomer resin (a-4) may be only one species, or may be a combination of two or more species.

The ternary ionomer resin (a-4) preferably has a bending rigidity of 10 MPa or higher, more preferably 11 MPa or higher, and further preferably 12 MPa or higher. The bending rigidity is also preferably 100 MPa or lower, more preferably 97 MPa or lower, and further preferably 95 MPa or lower. Too low a bending rigidity tends to lead to a golf ball with reduced resilience and therefore shorter flight distance; too high a bending rigidity may lead to a golf ball with reduced durability.

The ternary ionomer resin (a-4) preferably has a melt flow rate (190° C., 2.16 kg load) of 0.1 g/10 min or higher, more preferably 0.3 g/10 min or higher, and further preferably 0.5 g/10 min or higher. The melt flow rate is also preferably 70 g/10 min or lower, more preferably 60 g/10 min or lower, and further preferably 55 g/10 min or lower. When the melt flow rate is 0.1 g/10 min or higher, the golf ball resin composition has good fluidity, and can be easily molded into a thin layer. When the melt flow rate is 70 g/10 min or lower, a golf ball having better durability can be obtained.

The ternary ionomer resin (a-4) preferably has a slab hardness of 1 or higher, more preferably 3 or higher, and further preferably 5 or higher in Shore D hardness. The slab hardness (Shore D hardness) is also preferably 70 or lower, more preferably 65 or lower, and further preferably 60 or lower. When the slab hardness is 1 or higher, a member having moderate softness and therefore a golf ball having good resilience can be obtained. When the slab hardness is 70 or lower, a member having moderate hardness and therefore a golf ball having better durability can be obtained.

The golf ball resin composition of the present invention preferably contains the ternary copolymer (a-3) or the ternary ionomer resin (a-4) as the resin component (A). In this case, a member having moderate hardness and high resilience can be obtained.

In preferable embodiments, the resin component of the golf ball resin composition of the present invention consists only of at least one selected from the aforementioned components (a-1) to (a-4). Still, the resin component may optionally contain other thermoplastic elastomer(s) and/or thermoplastic resin(s) to the extent that they do not impair the effects of the present invention. If the resin component contains other thermoplastic elastomer(s) and/or thermoplastic resin(s), the total amount of the components (a-1) to (a-4) is preferably 50% by mass or more, more preferably 60% by mass or more, and further preferably 70% by mass or more of the resin component.

Next, the compound (B) containing a hydrocarbon chain, a cationic moiety, and an anionic moiety in its molecule used in the present invention is described. Such a compound is not particularly limited as long as it contains any hydrocarbon chain optionally substituted by a group such as a hydroxy group, any cationic moiety, and any anionic moiety. In particular, amphoteric surfactants can be suitably used.

The amphoteric surfactant is a surfactant that contains a cationic moiety and an anionic moiety in its molecule. Examples thereof include betaine amphoteric surfactants such as alkyl betaines, amido betaines, imidazolium betaines, alkyl sulfobetaines, and amido sulfobetaines; amido amino acid amphoteric surfactants; alkyl amino fatty acid salts; alkyl amine oxides; β-alanine amphoteric surfactants; glycine amphoteric surfactants; sulfobetaine amphoteric surfactants; and phosphobetaine amphoteric surfactants.

Examples of the alkyl betaine amphoteric surfactants include compounds represented by the following formula (1):

wherein $R^1$ represents a C8-C30 alkyl group or alkenyl group; and $R^2$ and $R^3$ are the same as or different from each other, and they each represent a C1-C20 alkyl group or hydroxyalkyl group.

Examples of the amido betaine amphoteric surfactants include compounds represented by the following formula (2):

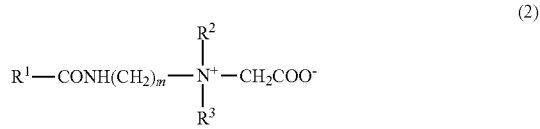

wherein $R^1$ represents a C8-C30 alkyl group or alkenyl group; $R^2$ and $R^3$ are the same as or different from each other, and they each represent a C1-C20 alkyl group or hydroxyalkyl group; and m represents an integer of 1 to 5.

Examples of the imidazolium betaine amphoteric surfactants include compounds represented by the following formula (3):

wherein $R^1$ represents a C8-C30 alkyl group or alkenyl group; and p and q are the same as or different from each other, and they each represent an integer of 1 to 5.

Examples of the alkyl sulfobetaine amphoteric surfactants include compounds represented by the following formula (4):

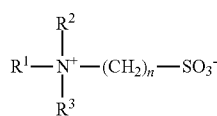

(4)

wherein $R^1$ represents a C8-C30 alkyl group or alkenyl group; $R^2$ and $R^3$ are the same as or different from each other, and they each represent a C1-C20 alkyl group or hydroxyalkyl group; and n represents an integer of 1 to 5.

Examples of the amide amino acid amphoteric surfactants include compounds represented by the following formula (5):

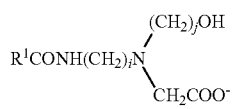

(5)

wherein $R^1$ represents a C8-C30 alkyl group or alkenyl group; and i and j are the same as or different from each other, and they each represent an integer of 1 to 5.

Examples of the alkyl amine oxides include compounds represented by the following formula (6):

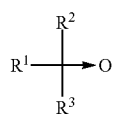

(6)

wherein $R^1$ represents a C8-C30 alkyl group or alkenyl group; and $R^2$ and $R^3$ are the same as or different from each other, and they each represent a C1-C20 alkyl group or hydroxyalkyl group.

In the formulas (1) to (6), $R^1$ to $R^3$ each may be a straight chain or a branched chain; at least one of $R^1$ to $R^3$ preferably has 12 to 18 carbon atoms; $R^2$ and $R^3$ each preferably have 1 to 5 carbon atoms; and the symbols m, p, q, n, i, and j each are preferably an integer of 1 to 3.

Examples of $R^1$ include alkyl groups such as octyl, nonyl, decyl, undecyl, dodecyl, tridecyl, tetradecyl, pentadecyl, hexadecyl, heptadecyl, octadecyl, isooctadecyl, nonadecyl, and eicosyl; alkenyl groups such as tetradecenyl, hexadecenyl, octadecenyl, isooctadecenyl, and eicosenyl; and mixtures thereof such as mixed alkyl groups including coconut oil alkyl groups, palm kernel oil alkyl groups, and beef tallow alkyl groups. Examples of $R^2$ and $R^3$ include methyl, ethyl, hydroxymethyl, and hydroxyethyl.

Specific examples of the amphoteric surfactants include dimethyl lauryl betaine, dimethyl oleyl betaine, dimethyl stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, oleyl dihydroxymethyl betaine, cocamidopropyl betaine, lauramidoalkyl betaines, 2-alkyl-N-carboxyalkyl imidazolium betaines, lauramidoalkyl hydroxy sulfobetaines, cocamidodialkyl hydroxyalkyl sulfobetaines, N-alkyl-β-aminopropionic acid salts, N-alkyl-β-iminodipropionic acid salts, alkyl diaminoalkyl glycines, alkyl polyaminoalkyl glycines, alkyl amino fatty acid sodium salts, N,N-dimethyl octyl amine oxide, N,N-dimethyl lauryl amine oxide, and N,N-dimethyl stearyl amine oxide.

Preferred among the above amphoteric surfactants are betaine amphoteric surfactants because they contribute to simultaneous achievement of resilience and flexibility, and more preferred are alkyl betaine amphoteric surfactants represented by, for example, the formula (1).

The amount of the compound (B) containing a hydrocarbon chain, a cationic moiety, and an anionic moiety in its molecule is preferably 1 part by mass or more, more preferably 3 parts by mass or more, and further preferably 10 parts by mass or more, for each 100 parts by mass of the resin component. The amount is also preferably 200 parts by mass or less, more preferably 150 parts by mass or less, and further preferably 100 parts by mass or less. If the amount is in the above range, the resilience and flexibility can be improved in a balanced manner.

The golf ball resin composition of the present invention may further include (C) a basic inorganic metal compound.

The basic inorganic metal compound (C) is optionally added in order to neutralize unneutralized carboxyl groups in the component (A). Examples of the basic inorganic metal compound (C) include elemental metals such as sodium, lithium, potassium, calcium, and magnesium; metal hydroxides such as magnesium hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, calcium carbonate, sodium carbonate, lithium carbonate, and potassium carbonate. Each of these basic inorganic metal compounds (C) may be used alone, or two or more of these may be used in combination. Preferred among these as the basic inorganic metal compound (C) are magnesium hydroxide, calcium hydroxide, sodium carbonate, lithium carbonate, potassium carbonate, zinc oxide, and copper oxide.

The amount of the basic inorganic metal compound (C) preferably exceeds 0 parts by mass, and is more preferably 1 part by mass or more, for each 100 parts by mass of the resin component. The amount is also preferably 200 parts by mass or less, more preferably 100 parts by mass or less, and further preferably 70 parts by mass or less. If the amount is too small, the amount of ionic associates may be too small, resulting in low resilience. Conversely, if the amount is too large, the durability may be poor.

In the golf ball resin composition of the present invention, the total degree of neutralization defined by the following formula is preferably 53% or higher, more preferably 60% or higher, and further preferably 80% or higher. The total degree of neutralization is also preferably 1000% or lower, more preferably 700% or lower, and further preferably 400% or lower. When the total degree is 53% or higher, the amount of ionic associates is sufficiently large, resulting in high resilience. When the total degree is 1000% or lower, the basic inorganic metal compound can be uniformly dispersed to enhance durability.

Total degree of neutralization (%) =

$$\frac{\sum\left(\begin{array}{c}\text{(the number of moles of cationic components}\\ \text{in the resin composition}\\ \text{(the valence of the cationic components)}\end{array}\right)\times}{\sum\left(\begin{array}{c}\text{(the number of moles of anionic components}\\ \text{in the resin composition}\\ \text{(the valence of the anionic components)}\end{array}\right)\times} \times 100$$

In the formula, "((the number of moles of cationic components in the resin composition)×(the valence of the cationic components))" may refer to (the number of moles of cationic components in the resin component (A))×(the valence of the cationic components)+(the number of moles of the cation-forming group or cationic component of the compound (B) containing a hydrocarbon chain, a cationic moiety, and an anionic moiety in its molecule)×(the valence of the cation-forming group or cationic component)+(the number of moles of the metal component of the basic inorganic metal compound (C))×(the valence of the metal component); and "((the number of moles of anionic components in the resin composition)×(the valence of the anionic components))" may refer to (the number of moles of carboxyl groups in the resin component (A))+(the number of moles of the anion-forming group of the compound (B) containing a hydrocarbon chain, a cationic moiety, and an anionic moiety in its molecule)×(the valence of the anion-forming group).

It should be noted that the numbers of moles of cationic components, cation-forming group, metal component, carboxyl groups, and anion-forming group include the respective non-ionized precursors. The amounts of cationic components, cation-forming group, and anion-forming group may be determined by, for example, neutralization titration.

The golf ball resin composition of the present invention may contain any additives such as pigments including white pigments (e.g. titanium oxide) and blue pigments, weighting agents, dispersants, antioxidants, ultraviolet absorbents, light stabilizers, fluorescent materials, and fluorescent brighteners as long as the performance of the golf ball is not impaired. Furthermore, the golf ball resin composition of the present invention may further contain, for example, a fatty acid and/or a metal salt thereof as long as the effects of the present invention are not impaired.

The amount of the white pigment (e.g. titanium oxide) is preferably 0.5 parts by mass or more, and more preferably 1 part by mass or more, for each 100 parts by mass of the resin component. The amount is also preferably 10 parts by mass or less, and more preferably 8 parts by mass or less. When the amount is 0.5 parts by mass or more, it is possible to impart hiding properties to a golf ball member to be produced. If the amount exceeds 10 parts by mass, a golf ball having poor durability may be obtained.

The golf ball resin composition of the present invention may be prepared, for example, by dry-blending the component (A) and the component (B), and optionally the component (C). The dry-blended mixture may be extruded into pellets. The dry-blending is preferably performed using, for example, a mixer that can mix pelletized materials, and more preferably a tumbler mixer. The extrusion may be performed using a known extruder such as a single-screw extruder, a twin-screw extruder, or a twin-screw/single-screw extruder.

The spin-lattice relaxation time of $^{13}C$ nuclei (T1) of the golf ball resin composition of the present invention as measured by high-resolution solid-state $^{13}C$ nuclear magnetic resonance (NMR) spectroscopy is preferably 15 seconds or shorter, more preferably 12 seconds or shorter, even more preferably 10 seconds or shorter, and still more preferably 8 seconds or shorter. When the decay of magnetization is measured in an ionomer resin based on the spin-lattice relaxation time of $^{13}C$ nuclei (T1) measured by high-resolution solid-state $^{13}C$ nuclear magnetic resonance (NMR) spectroscopy, this relaxation time (T1) is considered to be attributable to the trans conformation of the ethylene chains. The present inventors have considered that the moieties that may have a trans conformation include the poly(ethylene) crystals and the restricted ethylene chain layer around each ionic associate, and thus the relaxation components in the measurement of the decay of magnetization can also be divided into the short-time component and the long-time component. Based on the consideration, they have found that the restricted ethylene chain layer correlates with the resilience. In other words, the shorter the relaxation time (T1) is, the higher the mobility of the restricted ethylene chain layer is, and in turn the more enhanced the resilience is. Further, an increase in the molecular mobility is expected to cause an effect of enhancing flexibility. Therefore, the golf ball resin composition of the present invention preferably has a spin-lattice relaxation time of $^{13}C$ nuclei (T1) as small as described above, which is measured by high-resolution solid-state $^{13}C$ nuclear magnetic resonance (NMR) spectroscopy.

The golf ball resin composition of the present invention preferably has a storage modulus E' (Pa) and a loss modulus E" (Pa) which satisfy the following formula, as measured using a dynamic viscoelasticity apparatus in a tensile mode under the following conditions: vibration frequency 10 Hz, temperature 12° C., and measurement strain 0.05%.

A golf ball resin composition satisfying the following formula can have high resilience while maintaining softness in a high level. In the following formula, the symbol "log" means the common logarithm.

$$\log(E'/E''^2) \geq -6.55$$

It is considered that the higher the storage modulus E' (Pa) is or the lower the loss modulus E" (Pa) is, the higher the resilience is. In addition, the higher the storage modulus E' (Pa) is, the higher the hardness is. In the above formula, the numerator is the first power of the storage modulus E', whereas the denominator is the second power of the loss modulus E". This means that for enhancement of resilience, it is more effective to reduce the loss modulus E" than to increase the storage modulus E' so as to enhance hardness. In other words, what is necessary to enhance resilience without hardening the material is considered to reduce the modulus E" to reduce the energy loss upon deformation. In the present invention, an increase in the molecular mobility as described above enables the material to be smoothly deformed against a stress. Thus, presumably, the energy loss is small and the resilience is enhanced.

The value of $\log(E'/E''^2)$ is preferably −6.23 or higher, more preferably −6.02 or higher, and further preferably −5.89 or higher. The upper limit of $\log(E'/E''^2)$ is not particularly limited, and it is preferably −5.24 or lower, and more preferably −5.40 or lower because if the value of $\log(E'/E''^2)$ comes to −5.25, the coefficient of restitution becomes close to the maximum value of 1. The reason why the measurement of dynamic viscoelasticity is performed under the conditions: vibration frequency 10 Hz and temperature 12° C. is as follows. The period of contact between a golf ball and an impact bar (metal cylinder) is 500 μs in the measurement of coefficient of restitution at 40 m/s. If this contact is assumed to correspond to deformation in one cycle, this deformation corresponds to deformation at a frequency of several thousand hertz. Based on the frequency-temperature superposition principle of general ionomer resin, the dynamic viscoelasticity measured under the conditions: room temperature and vibration frequency of several thousand hertz corresponds to the dynamic viscoelasticity measured under the conditions: temperature 12° C. and vibration frequency 10 Hz.

The golf ball resin composition of the present invention preferably has a melt flow rate (190° C., 2.16 kg) of 0.01 g/10 min or higher, more preferably 0.05 g/10 min or higher, and further preferably 0.1 g/10 min or higher. The melt flow rate is preferably 100 g/10 min or lower, more preferably 80 g/10 min or lower, and further preferably 50 g/10 min or lower. If the melt flow rate is in the above range, the composition is favorably molded into a golf ball member.

The golf ball resin composition preferably has a rebound resilience of 40% or higher, more preferably 43% or higher, and further preferably 46% or higher. The golf ball resin composition with a rebound resilience of 40% or higher enables to provide a golf ball with excellent resilience (flight distance). The rebound resilience herein is a rebound resilience measured after the golf ball resin composition is formed into a sheet, and is measured by the below-mentioned method.

The golf ball resin composition preferably has a slab hardness of 5 or higher, more preferably 7 or higher, and further preferably 10 or higher in Shore D hardness. The slab hardness (Shore D hardness) is preferably 70 or lower, more preferably 65 or lower, further preferably 60 or lower, and most preferably 50 or lower. The golf ball resin composition with a slab hardness of 5 or higher enables to provide a golf ball with excellent resilience (flight distance). Conversely, the golf ball resin composition with a slab hardness of 70 or lower enables to provide a golf ball with excellent durability. The slab hardness of the golf ball resin composition herein is a hardness measured after the golf ball resin composition is formed into a sheet, and is measured by the below-mentioned method.

The golf ball of the present invention is not particularly limited as long as it includes a member made from the golf ball resin composition. Examples thereof include one-piece golf balls; two-piece golf balls which include a monolayer core and a cover disposed so as to cover the monolayer core; three-piece golf balls which include a core having a center and an intermediate monolayer disposed so as to cover the center, and a cover disposed so as to cover the core; and multi-piece golf balls (including the three-piece golf balls) which include a core having a center and one or more intermediate layers disposed so as to cover the center, and a cover disposed so as to cover the core, provided that any of the members of these golf balls is made from the golf ball resin composition of the present invention. Preferred among these are: golf balls including a core having one or more layers and a cover covering the core, wherein at least one of the layers of the core is made from the golf ball resin composition; and one-piece golf balls including a golf ball body that is made from the golf ball resin composition. Particularly preferred are: two-piece golf balls including a monolayer core and a cover disposed so as to cover the monolayer core, wherein the monolayer core is made from the golf ball resin composition; and multi-piece golf balls including a core having a center and one or more intermediate layers disposed so as to cover the center, and a cover disposed so as to cover the core, wherein the center is made from the golf ball resin composition.

The following will describe one example of the golf ball of the present invention based on, but not limited to, one embodiment of a two-piece golf ball including a core and a cover disposed so as to cover the core, wherein the core is made from the aforementioned golf ball resin composition.

The core may be formed by, for example, injection-molding the above golf ball resin composition. Specifically, it is preferable that the golf ball resin composition is heat-melted at 160° C. to 260° C. and injected into a mold that is clamped under a pressure of 1 to 100 MPa in 1 to 100 seconds, and then the resin composition is cooled for 30 to 300 seconds and finally the mold is opened.

The shape of the core is preferably a spherical shape. If the core is not spherical, the cover may have a non-uniform thickness, thereby resulting in its portion having poor covering performance.

The diameter of the core is preferably 39.00 mm or greater, more preferably 39.25 mm or greater, and further preferably 39.50 mm or greater. The diameter is preferably 42.37 mm or smaller, more preferably 42.22 mm or smaller, and further preferably 42.07 mm or smaller. When the diameter is 39.00 mm or greater, the cover layer has a moderate thickness, resulting in good resilience. Also, when the diameter is 42.37 mm or smaller, the cover layer has a moderate thinness, thereby allowing the cover to provide sufficient protection.

In the case that the core has a diameter of 39.00 to 42.37 mm, the amount of compression deformation (shrink in the compression direction) of the core under a load from an initial load of 98 N to a final load of 1275 N is preferably 1.00 mm or greater, and more preferably 1.10 mm or greater. The amount of compression deformation is preferably 5.00 mm or smaller, more preferably 4.90 mm or smaller, and further preferably 4.80 mm or smaller. When the amount of compression deformation is 1.00 mm or greater, a good shot feeling is obtained. When the amount of compression deformation is 5.00 mm or smaller, good resilience is achieved.

The surface hardness of the core is preferably 20 or higher, more preferably 25 or higher, and further preferably 30 or higher in Shore D hardness. The surface hardness (Shore D hardness) is preferably 70 or lower, and more preferably 69 or lower. When the surface hardness is 20 or higher, the core has moderate softness, and good resilience is achieved. Also, when the surface hardness is 70 or lower, the core has moderate hardness, and a good shot feeling is obtained.

The central hardness of the core is preferably 5 or higher, more preferably 7 or higher, and further preferably 10 or higher in Shore D hardness. If the central hardness is lower than 5, the core may be too soft, resulting in low resilience. The central hardness of the core is also preferably 50 or lower, more preferably 48 or lower, and further preferably 46 or lower in Shore D hardness. If the central hardness exceeds 50, the core may be too hard, leading to a poor shot feeling. In the present invention, the central hardness of the core means a hardness measured as follows: the core is cut into two equal parts, and the part is measured at the central point of the cut plane using a spring type Shore D hardness tester.

The core preferably further contains a filler. A filler is mainly intended to be added as a weighting agent for adjusting the density of a golf ball to be obtained as the final product in the range of 1.0 to 1.5, and it may be added if necessary. Examples of the filler include inorganic fillers such as zinc oxide, barium sulfate, calcium carbonate, magnesium oxide, tungsten powder, and molybdenum powder. The amount of the filler is preferably 0.5 parts by mass or more, and more preferably 1.0 part by mass or more, for each 100 parts by mass of the resin component. The amount is preferably 30 parts by mass or less, and more preferably 20 parts by mass or less. If the amount of the filler is less than 0.5 parts by mass, it tends to be difficult to adjust the weight. If the amount exceeds 30 parts by mass, the weight fraction of the resin component may be small and the resilience tends to be lowered.

The cover of the golf ball of the present invention is preferably made from a cover composition containing a resin component. Examples of resins that may be contained in the resin component include various resins such as ionomer resins, polyester resins, urethane resins (e.g. thermoplastic urethane resins, two-pack curable urethane resins), and polyamide resins; thermoplastic polyamide elastomers available from Arkema under the trade name "Pebax (registered trademark) (e.g. "Pebax 2533")"; thermoplastic polyester elastomers available from DU PONT-TORAY CO., LTD. under the trade name "Hytrel (registered trademark) (e.g. "Hytrel 3548", "Hytrel 4047")"; thermoplastic polyurethane elastomers available from BASF Japan Ltd. under the trade name "Elastollan (registered trademark) (e.g. "Elastollan XNY 97A")"; and thermoplastic styrene elastomers available from Mitsubishi Chemical Corp. under the trade name "RABALON (registered trademark)". Each of these resins may be used alone, or two or more of these may be used as a blend.

Preferred examples of ionomer resins usable for the cover of the golf ball include those listed for the component (a-2) or the component (a-4).

The cover composition used for the cover of the golf ball more preferably contains a polyurethane resin (including a polyurethane elastomer) or an ionomer resin as the resin component. The amount of the polyurethane resin or the ionomer resin in the resin component of the cover composition is preferably 50% by mass or more, more preferably 60% by mass or more, and further preferably 70% by mass or more.

In addition to the aforementioned resin component, the cover composition may further contain any additives such as pigments such as white pigments (e.g. titanium oxide), blue pigments, and red pigments, zinc oxide, weighting agents such as calcium carbonate and barium sulfate, dispersants, antioxidants, ultraviolet absorbents, light stabilizers, fluorescent materials, and fluorescent brighteners, to the extent that they do not impair the performance of the cover.

The amount of the white pigment (e.g. titanium oxide) is preferably 0.5 parts by mass or more, and more preferably 1 part by mass or more, for each 100 parts by mass of the resin component used for the cover. The amount is preferably 10 parts by mass or less, and more preferably 8 parts by mass or less. When the amount of the white pigment is 0.5 parts by mass or more, it is possible to impart hiding properties to the cover. If the amount exceeds 10 parts by mass, a cover having poor durability may be obtained.

Examples of the method for forming the cover of the golf ball of the present invention include: compression molding in which hollow shells are formed from the cover composition, a core is covered with the plurality of shells, and then the assembly is compression-molded (preferably, hollow half shells are formed from the cover composition, and then a core is covered with the two half shells and the assembly is compression-molded); and injection molding in which the cover composition is directly injection-molded on a core.

In the case of forming a cover by injection-molding of the cover composition, a pelletized cover composition, which is prepared by extrusion in advance, may be injection-molded, or the materials for a cover such as a base resin component and a pigment may be dry-blended and then directly injection-molded. Upper and lower molds for forming a cover each preferably have a hemispherical cavity with pimples a part of which also serve as retractable hold pins. A cover can be formed by injection molding as follows: the hold pins are protruded; a core is put into the mold and held by the pins; then, the cover composition is injected thereon and cooled. More specifically, it is preferable that the mold is clamped under a pressure of 9 to 15 MPa, the cover composition heated to 200° C. to 250° C. is injected into the mold in 0.5 to 5 seconds, and then the composition is cooled for 10 to 60 seconds and the mold is opened.

In forming a cover, indentations called dimples are formed on the surface, in general. The cover preferably has 200 to 500 dimples in total. If the total number of dimples is less than 200, the effect of dimples is less likely to be achieved. Conversely, if the total number of dimples exceeds 500, the effect of dimples is less likely to be achieved because the individual size of the dimples is small. The shape (in a plan view) of each dimple to be formed is not particularly limited, and examples thereof include circular shapes; polygonal shapes such as substantially triangular shapes, substantially quadrangular shapes, substantially pentagonal shapes, and substantially hexagonal shapes; and other irregular shapes. Each of these shapes may be employed alone, or two or more shapes may be employed in combination.

The thickness of the cover is preferably 2.0 mm or smaller, more preferably 1.6 mm or smaller, further preferably 1.2 mm or smaller, and particularly preferably 1.0 mm or smaller. When the thickness is 2.0 mm or smaller, the resulting golf ball can achieve better resilience and shot feeling. The thickness of the cover is preferably 0.1 mm or greater, more preferably 0.2 mm or greater, and further preferably 0.3 mm or greater. If the thickness is smaller than 0.1 mm, the cover may be difficult to form by molding, and the durability and abrasion resistance of the cover may be poor.

After the cover is formed, the golf ball body is taken out of the mold, and is preferably subjected to surface treatments such as deburring, cleaning, and sandblasting, as necessary. If desired, a paint layer or a mark may be formed thereon. The thickness of the paint layer is not particularly limited, and it is preferably 5 μm or greater, and more preferably 7 μm or greater. The thickness is preferably 25 μm or smaller, and more preferably 18 μm or smaller. If the thickness is smaller than 5 μm, the paint layer may easily disappear by abrasion after continuous use. If the thickness exceeds 25 μm, the effect of dimples is likely to be reduced, resulting in reduction of the flying performance of the golf ball.

The amount of compression deformation (shrink in the compression direction) of the golf ball of the present invention under a load from an initial load of 98 N to a final load of 1275 N is preferably 2.0 mm or greater, and more preferably 2.2 mm or greater. The amount of compression deformation is preferably 4.0 mm or smaller, and more preferably 3.5 mm or smaller. The golf ball with an amount of compression deformation of 2.0 mm or greater has moderate hardness and gives a good shot feeling. Also, the golf ball with an amount of compression deformation of 4.0 mm or smaller has high resilience.

Hereinbefore, the embodiments in which the golf ball resin composition of the present invention is used for a core are described. The golf ball resin composition of the present invention can also be used for a center, an intermediate layer, and a cover. In the case of a center made from the golf ball resin composition of the present invention, an intermediate layer is combined which is made from materials such as those listed above as the resin component for the cover.

EXAMPLES

The present invention will be described in detail referring to, but not limited to, examples.

[Evaluation Methods]

(1) Slab Hardness (Shore D Hardness)

The golf ball resin composition was hot press-molded into a sheet having a thickness of about 2 mm, and the sheet was stored at 23° C. for 2 weeks. Three or more pieces of the sheet were stacked on one another so as not to be affected by the measurement substrate and the like, and the slab hardness of the stack was measured using a P1-series auto rubber hardness tester (from KOBUNSHI KEIKI CO., LTD.) including a spring type Shore D hardness tester in conformity with ASTM-D 2240.

(2) Melt flow Rate (MFR) (g/10 min)

The MFR was measured using a flow tester (Shimadzu Flowtester CFT-100C manufactured by Shimadzu Corp.) in conformity with JIS K 7210. The measurement was performed at a measurement temperature of 190° C. and a load of 2.16 kg.

(3) Rebound Resilience (%)

The golf ball resin composition was hot press-molded into a sheet with a thickness of about 2 mm, and then circular pieces having a diameter of 28 mm were punched out of this sheet. Six pieces were stacked to prepare a cylindrical specimen with a thickness of about 12 mm and a diameter of 28 mm. This specimen was subjected to the Lupke rebound resilience test (testing at temperature 23° C. and humidity 50RH %). The specimen preparation and the testing method were in conformity with JIS K 6255.

(4) Amount of Compression Deformation

A spherical body was compressed under a load from an initial load of 98 N to a final load of 1275 N, and the amount of deformation in the compression direction (shrink in the compression direction) of the spherical body was measured. The amounts of deformation of spherical bodies were shown relative to the amount of deformation of the spherical body No. 14 in Tables 1 and 2, or the amount of deformation of the spherical body No. 42 in Table 3, or the amount of deformation of the spherical body No. 46 in Table 4.

(5) Coefficient of Restitution

A 198.4-g metal cylinder was allowed to collide with each spherical body at a speed of 40 m/s. The speeds of the cylinder and the golf ball before and after the collision were measured. Based on these speeds and the weight of each golf ball, the coefficient of restitution of the golf balls was calculated. The measurement was conducted by using twelve spherical bodies of each kind, and their average value was treated as the coefficient of restitution for the kind of spherical body in question.

(6) Shot Feeling

Each golf ball was subjected to a hitting test by 10 amateur (advanced) golfers using a driver, and the golfers evaluated the ball for the feeling upon hitting it based on the following criteria. The most common grade among the grades given by the 10 golfers was treated as the shot feeling of the golf ball.

Criteria for Grades

Excellent: small impact and good feeling

Good: ordinary levels

Poor: large impact and poor feeling (7) Method of Measuring Spin-Lattice Relaxation Time of $^{13}C$ Nuclei (T1) by High-Resolution Solid-State $^{13}C$ Nuclear Magnetic Resonance (NMR) Spectroscopy Device: Bruker Avance 400

Measurement method: T1 relaxation time measurement by Torchia method

Measurement frequency: 100.6256207 MHz

Measurement temperature: room temperature

Standard substance: adamantane

Magic angle spinning rate: 5000 Hz

Pulse width: 4.80 μsec

Contact time: 2000 μsec

Pulse interval: 1 μsec, 100 msec, 500 msec, 1 sec, 2 sec, 3 sec, 4 sec, 6 sec, 8 sec, 10 sec, 12 sec, 15 sec, 20 sec, 40 sec, 80 sec, and 120 sec Magnetic field strength: 9.4 T (8) Measurement of Storage Modulus E' (Pa) and Loss Modulus E" (Pa)

The storage modulus E' (Pa) and loss modulus E" (Pa) of the golf ball resin composition were measured under the following conditions.

Device: dynamic viscoelasticity apparatus Rheogel-E 4000 (available from UBM)

Measurement sample: a 4-mm-wide specimen (distance between clamps: 20 mm) cut out of a 2-mm-thick sheet that is prepared by press-molding the golf ball resin composition Measurement mode: Tensile Measurement temperature: 12° C.

Vibration frequency: 10 Hz

Measurement strain: 0.05%

[Preparation of Spherical Body (Core)]

According to Table 1 to 4, the materials for composition were dry-blended and mixed using a twin-screw kneading extruder. Then, the mixture was extruded into cold water to form a strand. The extruded strand was cut into pellets using a pelletizer, whereby a pelletized golf ball resin composition was prepared. Here, the extrusion was performed at a screw diameter of 45 mm, a screw rotation rate of 200 rpm, and a screw L/D ratio of 35. The mixture was heated to 160° C. to 230° C. in the die of the extruder. The pelletized golf ball resin composition obtained was injection-molded at 220° C., and thereby a spherical body (core) with a diameter of 40 mm was obtained.

TABLE 1

Ternary ionomer resin (highly neutralized): Examples

| | | Golf ball resin composition (spherical body) No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Composition | NUCREL AN4319 | 100.0 | 100.0 | 100.0 | 100.0 | 100.0 | 100.0 | 100.0 | 100.0 | 100.0 | 100.0 | 100.0 | 100.0 | 100.0 |
| | Magnesium hydroxide | 2.7 | 3.8 | 3.8 | 7.2 | 10.7 | 14.3 | 2.7 | 3.8 | 2.7 | 3.8 | 2.7 | 3.8 | 3.8 |
| | Oleyl betaine | 30.0 | 30.0 | 70.0 | 70.0 | 70.0 | 70.0 | — | — | — | — | — | — | — |
| | Lauryl betaine | — | — | — | — | — | — | 30.0 | 30.0 | 70.0 | 70.0 | — | — | — |

TABLE 1-continued

Ternary ionomer resin (highly neutralized): Examples

| | | Golf ball resin composition (spherical body) No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| | Stearyl betaine | — | — | — | — | — | — | — | — | — | — | 30.0 | 30.0 | 70.0 |
| | Oleic acid | — | — | — | — | — | — | — | — | — | — | — | — | — |
| | Stearic acid | — | — | — | — | — | — | — | — | — | — | — | — | — |
| Physical properties | Total degree of neutralization (%) | 100 | 121 | 113 | 152 | 194 | 237 | 100 | 118 | 100 | 111 | 100 | 121 | 113 |
| | Melt flow rate (g/10 min) | 0.2 | 0.1 | 0.4 | 0.3 | 0.2 | 0.2 | 0.2 | 0.1 | 0.4 | 0.3 | 0.2 | 0.1 | 0.4 |
| | Shore D hardness | 35 | 39 | 19 | 22 | 24 | 25 | 31 | 35 | 19 | 20 | 36 | 39 | 31 |
| | Rebound resilience (%) | 68 | 71 | 66 | 72 | 78 | 78 | 69 | 68 | 48 | 53 | 64 | 64 | 58 |
| | $\log(E'/E''^2)$ | −5.64 | −5.52 | −5.71 | −5.48 | −5.26 | −5.24 | −5.62 | −5.63 | −6.41 | −6.21 | −5.78 | −5.78 | −6.04 |
| | T1 relaxation time (sec) | 3.9 | 3.3 | 4.4 | 3.1 | 2.1 | 2.1 | 3.8 | 3.9 | 13.7 | 9.9 | 4.9 | 5.0 | 7.5 |
| | Amount of compression deformation | 0.68 | 0.53 | 3.09 | 2.05 | 1.77 | 1.53 | 0.92 | 0.68 | 2.94 | 2.63 | 0.65 | 0.53 | 0.90 |
| | Coefficient of restitution | 0.851 | 0.884 | 0.831 | 0.894 | 0.955 | 0.960 | 0.857 | 0.854 | 0.638 | 0.694 | 0.812 | 0.811 | 0.741 |
| | Shot feeling | Excellent | Excellent | Excellent | Excellent | Excellent | Excellent | Excellent | Excellent | Excellent | Excellent | Excellent | Excellent | Excellent |

Composition: parts by mass

TABLE 2

Ternary ionomer resin (highly neutralized): Comparative Examples

| | | Golf ball resin composition (spherical body) No. | | | | | | | | | |
|---|---|---|---|---|---|---|---|---|---|---|---|
| | | 14 | 15 | 16 | 17 | 18 | 19 | 20 | 21 | 22 | 23 |
| Composition | NUCREL AN4319 | 100.0 | 100.0 | 100.0 | 100.0 | 100.0 | 100.0 | 100.0 | 100.0 | 100.0 | 100.0 |
| | Magnesium hydroxide | — | 1.6 | 2.7 | 3.8 | 5.9 | 9.9 | 13.8 | 6.0 | 9.9 | 13.9 |
| | Oleyl betaine | — | — | — | — | — | — | — | — | — | — |
| | Lauryl betaine | — | — | — | — | — | — | — | — | — | — |
| | Stearyl betaine | — | — | — | — | — | — | — | — | — | — |
| | Oleic acid | — | — | — | — | — | — | — | 70.0 | 70.0 | 70.0 |
| | Stearic acid | — | — | — | — | 70.0 | 70.0 | 70.0 | — | — | — |
| Physical properties | Total degree of neutralization (%) | 0 | 60 | 100 | 140 | 60 | 100 | 140 | 60 | 100 | 140 |
| | Melt flow rate (g/10 min) | 65.1 | 2.2 | 1.1 | 0.9 | 5.8 | 3.6 | 2.3 | 6.1 | 3.8 | 2.2 |
| | Shore D hardness | 32 | 50 | 51 | 56 | 54 | 57 | 57 | 24 | 43 | 50 |
| | Rebound resilience (%) | 44 | 56 | 58 | 60 | 54 | 61 | 62 | 51 | 65 | 73 |
| | $\log(E'/E''^2)$ | −6.55 | −6.11 | −6.01 | −5.95 | −6.16 | −5.90 | −5.88 | −6.27 | −5.73 | −5.45 |
| | T1 relaxation time (sec) | 24.0 | 24.0 | 7.3 | 6.5 | 9.3 | 6.0 | 5.9 | 11.0 | 4.6 | 2.9 |
| | Amount of compression deformation | 1.00 | 1.00 | 0.28 | 0.23 | 0.24 | 0.22 | 0.22 | 1.73 | 0.42 | 0.30 |
| | Coefficient of restitution | 0.449 | 0.449 | 0.747 | 0.766 | 0.705 | 0.778 | 0.783 | 0.676 | 0.824 | 0.902 |
| | Shot feeling | Excellent | Good | Good | Poor | Poor | Poor | Poor | Excellent | Excellent | Good |

Composition: parts by mass

TABLE 3

Binary ionomer resin (1) (highly neutralized)

| | | Golf ball resin composition (spherical body) No. | | | | | | | | | | | | |
|---|---|---|---|---|---|---|---|---|---|---|---|---|---|---|
| | | Examples | | | | | | | | | Comparative Examples | | | |
| | | 24 | 25 | 26 | 27 | 28 | 29 | 30 | 31 | 32 | 42 | 43 | 44 | 45 |
| Composition | NUCREL N1560 | 100.0 | 100.0 | 100.0 | 100.0 | 100.0 | 100.0 | 100.0 | 100.0 | 100.0 | 100.0 | 100.0 | 100.0 | 100.0 |
| | Magnesium hydroxide | 3.5 | 5.1 | 6.7 | 5.1 | 6.5 | 10.7 | 15.3 | 15.3 | 20.0 | — | 3.0 | 5.1 | 7.1 |

TABLE 3-continued

Binary ionomer resin (1) (highly neutralized)

Golf ball resin composition (spherical body) No.

| | | Examples | | | | | | | | | Comparative Examples | | | |
|---|---|---|---|---|---|---|---|---|---|---|---|---|---|---|
| | | 24 | 25 | 26 | 27 | 28 | 29 | 30 | 31 | 32 | 42 | 43 | 44 | 45 |
| Physical properties | Stearyl betaine | — | — | — | — | — | — | — | 70.0 | — | — | — | — | — |
| | Oleyl betaine | 30.0 | 30.0 | 30.0 | 70.0 | 70.0 | 70.0 | 70.0 | — | 70.0 | — | — | — | — |
| | Total degree of neutralization (%) | 79 | 100 | 121 | 100 | 113 | 152 | 194 | 194 | 237 | 0 | 59 | 100 | 140 |
| | Melt flow rate (g/10 min) | 0.4 | 0.2 | 0.1 | 0.3 | 0.4 | 0.3 | 0.2 | 0.2 | 0.2 | 60.0 | 0.4 | 0.2 | 0.1 |
| | Shore D hardness | 35 | 40 | 44 | 25 | 25 | 27 | 29 | 33 | 30 | 37 | 55 | 56 | 61 |
| | Rebound resilience (%) | 64 | 75 | 78 | 55 | 73 | 79 | 85 | 85 | 85 | 51 | 63 | 65 | 67 |
| | log $(E'/E''^2)$ | −5.79 | −5.37 | −5.26 | −6.13 | −5.45 | −5.22 | −4.99 | −4.99 | −4.99 | −6.28 | −5.83 | −5.75 | −5.67 |
| | T1 relaxation time (sec) | 5.0 | 2.6 | 2.1 | 8.8 | 2.9 | 2.0 | 1.4 | 1.4 | 1.4 | 11.2 | 5.4 | 4.7 | 4.2 |
| | Amount of compression deformation | 1.14 | 0.83 | 0.66 | 2.55 | 2.55 | 2.12 | 1.79 | 2.15 | 1.65 | 1.00 | 0.39 | 0.37 | 0.30 |
| | Coefficient of restitution | 0.809 | 0.925 | 0.957 | 0.715 | 0.904 | 0.967 | 0.970 | 0.970 | 0.970 | 0.672 | 0.799 | 0.820 | 0.841 |
| | Shot feeling | Good | Good | Good | Excellent | Excellent | Excellent | Excellent | Excellent | Good | Good | Poor | Poor | Poor |

Composition: parts by mass

TABLE 4

Binary ionomer resin (2) (highly neutralized)

Golf ball resin composition (spherical body) No.

| | | Examples | | | | | | | | | Comparative Examples | | | |
|---|---|---|---|---|---|---|---|---|---|---|---|---|---|---|
| | | 33 | 34 | 35 | 36 | 37 | 38 | 39 | 40 | 41 | 46 | 47 | 48 | 49 |
| Physical properties | NUCREL N2050H | 100.0 | 100.0 | 100.0 | 100.0 | 100.0 | 100.0 | 100.0 | 100.0 | 100.0 | 100.0 | 100.0 | 100.0 | 100.0 |
| | Magnesium hydroxide | 4.8 | 6.8 | 8.7 | 6.8 | 8.4 | 13.3 | 18.6 | 18.6 | 24.0 | — | 4.0 | 6.8 | 9.5 |
| | Stearyl betaine | — | — | — | — | — | — | — | — | — | — | — | — | — |
| | Oleyl betaine | 30.0 | 30.0 | 30.0 | 70.0 | 70.0 | 70.0 | 70.0 | 70.0 | 70.0 | — | — | — | — |
| | Total degree of neutralization (%) | 79 | 100 | 121 | 100 | 113 | 152 | 194 | 194 | 237 | 0 | 59 | 100 | 140 |
| | Melt flow rate (g/10 min) | 0.3 | 0.1 | 0.1 | 0.2 | 0.3 | 0.2 | 0.1 | 0.1 | 0.1 | 500.0 | 0.5 | 0.2 | 0.2 |
| | Shore D hardness | 45 | 50 | 54 | 34 | 34 | 37 | 39 | 43 | 40 | 47 | 65 | 66 | 71 |
| | Rebound resilience (%) | 67 | 78 | 81 | 58 | 76 | 82 | 87 | 87 | 87 | 54 | 66 | 68 | 68 |
| | log $(E'/E''^2)$ | −5.67 | −5.26 | −5.14 | −6.02 | −5.33 | −5.10 | −4.91 | −4.91 | −4.91 | −6.17 | −5.71 | −5.64 | −5.64 |
| | T1 relaxation time (sec) | 4.2 | 2.1 | 1.8 | 7.3 | 2.4 | 1.7 | 1.2 | 1.2 | 1.2 | 9.3 | 4.5 | 3.9 | 3.9 |
| | Amount of compression deformation | 1.11 | 0.86 | 0.72 | 2.17 | 2.17 | 1.77 | 1.56 | 1.35 | 1.47 | 1.00 | 0.46 | 0.45 | 0.37 |
| | Coefficient of restitution | 0.841 | 0.957 | 0.968 | 0.746 | 0.936 | 0.959 | 0.982 | 0.982 | 0.982 | 0.704 | 0.830 | 0.851 | 0.851 |
| | Shot feeling | Good | Good | Good | Good | Good | Good | Good | Good | Good | Poor | Poor | Poor |

Composition: parts by mass

The materials shown in Tables 1 to 4 are as follows.

NUCREL AN4319: ethylene/methacrylic acid/butyl acrylate copolymer (DU PONT-MITSUI POLYCHEMICALS CO., LTD., melt flow rate (190° C., 2.16 kg): 55 g/10 min, bending rigidity: 21 MPa, methacrylic acid content: 8% by mass)

NUCREL N1560: ethylene/methacrylic acid copolymer (DU PONT-MITSUI POLYCHEMICALS CO., LTD., melt flow rate (190° C., 2.16 kg): 60 g/10 min, bending rigidity: 83 MPa, methacrylic acid content: 15% by mass)

NUCREL N2050H: ethylene/methacrylic acid copolymer (DU PONT-MITSUI POLYCHEMICALS CO., LTD., melt flow rate (190° C., 2.16 kg): 500 g/10 min, bending rigidity: 82 MPa, methacrylic acid content: 20% by mass)

Magnesium hydroxide: product of Wako Pure Chemical Industries, Ltd.

Oleyl betaine: purified product (without water and salt) of "Chembetaine OL" (The Lubrizol Corp.)

Lauryl betaine: purified product (without water and salt) of "NISSANANON BL" (NOF Corp.)

Stearyl betaine: purified product (without water and salt) of "AMPHITOL 86B" (Kao Corp.)

Oleic acid: product of TOKYO CHEMICAL INDUSTRY CO., LTD.

Stearic acid: powdery stearic acid "Tsubaki" (NOF Corp.)

The results in Tables 1 and 2 show that in comparison with the spherical bodies Nos. 14 to 17 containing a ternary copolymer and the spherical bodies Nos. 18 to 23 further containing oleic acid or stearic acid with this resin, the spherical bodies Nos. 1 to 13 containing oleyl betaine, lauryl betaine or stearyl betaine with the resin exhibited enhanced resilience while the materials had more flexibility. Therefore, it was demonstrated that such an amphoteric surfactant enables to provide a golf ball having excellent properties in terms of both shot feeling and resilience.

The results in Tables 3 and 4 show that in comparison with the spherical bodies Nos. 42 to 49 containing a binary copolymer, the spherical bodies Nos. 24 to 41 containing oleyl betaine or stearyl betaine with the resin exhibited enhanced resilience while the materials had more flexibility. Therefore, it was demonstrated that such an amphoteric surfactant enables to provide a golf ball having excellent properties in terms of both shot feeling and resilience.

Industrial Applicability

The present invention provides a golf ball resin composition excellent in resilience and flexibility, and the resin composition can be used to provide a golf ball having excellent properties in terms of resilience and shot feeling.

The invention claimed is:

1. A golf ball, comprising a member made from a golf ball resin composition, said resin composition comprising:
   (A) a resin component containing at least one member selected from the group consisting of:
      (a-1) a binary copolymer of an olefin and a C3-C8 $\alpha,\beta$-unsaturated carboxylic acid;
      (a-2) a metal ion-neutralized product of a binary copolymer of an olefin and a C3-C8 $\alpha,\beta$-unsaturated carboxylic acid;
      (a-3) a ternary copolymer of an olefin, a C3-C8 $\alpha,\beta$-unsaturated carboxylic acid, and an $\alpha,\beta$-unsaturated carboxylic acid ester; and
      (a-4) a metal ion-neutralized product of a ternary copolymer of an olefin, a C3-C8 $\alpha,\beta$-unsaturated carboxylic acid, and an $\alpha,\beta$-unsaturated carboxylic acid ester, and
   (B) an amphoteric surfactant compound containing a hydrocarbon chain, a cationic moiety, and an anionic moiety in its molecule, wherein the amphoteric surfactant is at least one member selected from the group consisting of lauryl betaine, oleyl betaine, stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, and oleyl dihydroxymethyl betaine.

2. The golf ball according to claim 1, wherein the compound (B) is present in an amount of 1 to 200 parts by mass for each 100 parts by mass of the resin component.

3. The golf ball according to claim 1, further comprising (C) a basic inorganic metal compound in an amount of 100 parts by mass or less for each 100 parts by mass of the resin component.

4. The golf ball according to claim 3, wherein the basic inorganic metal compound (C) is selected from the group consisting of magnesium hydroxide, calcium hydroxide, sodium carbonate, lithium carbonate, potassium carbonate, zinc oxide, and copper oxide.

5. The golf ball according to claim 1, wherein the golf ball resin composition has a total degree of neutralization of 53% or higher, the total degree of neutralization being determined by the following formula:

$$\text{Total degree of neutralization (\%)} = \frac{\Sigma\left(\begin{pmatrix}\text{the number of moles of cationic components} \\ \text{in the resin composition}\end{pmatrix} \times \right.}{\Sigma\left(\begin{pmatrix}\text{the number of moles of anionic components} \\ \text{in the resin composition}\end{pmatrix} \times \right.} \times 100.$$

6. The golf ball according to claim 1, wherein a spin-lattice relaxation time of $^{13}C$ nuclei of the golf ball resin composition as measured by high-resolution solid state $^{13}C$ nuclear magnetic resonance spectroscopy is 15 seconds or shorter.

7. The golf ball according to any one of claim 1, wherein the golf ball resin composition has a storage modulus E' (Pa) and a loss modulus E'' (Pa) which satisfy the following formula:

$$\log(E'/E''^2) \geq -6.55$$

wherein "log" refers to the common logarithm,
   the storage modulus and loss modulus being measured using a dynamic viscoelasticity apparatus in a tensile mode under the following conditions: vibration frequency 10 Hz, temperature 12° C., and measurement strain 0.05%.

8. A golf ball, comprising: a core having one or more layers; and a cover covering the core, wherein at least one of the layers of the core is made from the golf ball resin composition, comprising:
   (A) a resin component containing at least one member selected from the group consisting of:
      (a-1) a binary copolymer of an olefin and a C3-C8 $\alpha,\beta$-unsaturated carboxylic acid;
      (a-2) a metal ion-neutralized product of a binary copolymer of an olefin and a C3-C8 $\alpha,\beta$-unsaturated carboxylic acid;
      (a-3) a ternary copolymer of an olefin, a C3-C8 $\alpha,\beta$-unsaturated carboxylic acid, and an $\alpha,\beta$-unsaturated carboxylic acid ester; and (a-4) a metal ion-neutralized product of a ternary copolymer of an olefin, a C3-C8 α, β-unsaturated carboxylic acid, and an α, β-unsaturated carboxylic acid ester, and (B) an amphoteric surfactant compound containing a hydrocarbon chain, a cationic moiety, and an anionic moiety in its molecule, wherein the amphoteric surfactant is at least one member selected from the group consisting of lauryl betaine, oleyl betaine, stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, and oleyl dihydroxymethyl betaine.

9. The golf ball according to claim 8, wherein a spin-lattice relaxation time of $^{13}C$ nuclei of the golf ball resin composition as measured by high-resolution solid state $^{13}C$ nuclear magnetic resonance spectroscopy is 15 seconds or shorter.

10. The golf ball according to any one of claim 8, wherein the golf ball resin composition has a storage modulus E' (Pa) and a loss modulus E" (Pa) which satisfy the following formula:

$$\log(E'/E''^2) \geq -6.55$$

wherein "log" refers to the common logarithm,
the storage modulus and loss modulus being measured using a dynamic viscoelasticity apparatus in a tensile mode under the following conditions: vibration frequency 10 Hz, temperature 12° C., and measurement strain 0.05%.

11. A one-piece golf ball, comprising a golf ball body that is made from the golf ball resin composition, said resin composition comprising:
(A) a resin component containing at least one member selected from the group consisting of:
(a-1) a binary copolymer of an olefin and a C3-C8 α, β-unsaturated carboxylic acid;
(a-2) a metal ion-neutralized product of a binary copolymer of an olefin and a C3-C8 α, β-unsaturated carboxylic acid;
(a-3) a ternary copolymer of an olefin, a C3-C8 α, β-unsaturated carboxylic acid, and an α, β-unsaturated carboxylic acid ester; and
(a-4) a metal ion-neutralized product of a ternary copolymer of an olefin, a C3-C8 α, β-unsaturated carboxylic acid, and an α, β-unsaturated carboxylic acid ester, and
(B) an amphoteric surfactant compound containing a hydrocarbon chain, a cationic moiety, and an anionic moiety in its molecule, wherein the amphoteric surfactant is at least one member selected from the group consisting of lauryl betaine, oleyl betaine, stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, and oleyl dihydroxymethyl betaine.

12. The golf ball according to claim 11, wherein a spin-lattice relaxation time of $^{13}C$ nuclei of the golf ball resin composition as measured by high-resolution solid state $^{13}C$ nuclear magnetic resonance spectroscopy is 15 seconds or shorter.

13. The golf ball according to any one of claim 11, wherein the golf ball resin composition has a storage modulus E' (Pa) and a loss modulus E" (Pa) which satisfy the following formula:

$$\log(E'/E''^2) \geq -6.55$$

wherein "log" refers to the common logarithm,
the storage modulus and loss modulus being measured using a dynamic viscoelasticity apparatus in a tensile mode under the following conditions: vibration frequency 10 Hz, temperature 12° C., and measurement strain 0.05% .

* * * * *